United States Patent [19]

Mizushima et al.

[11] Patent Number: 5,288,133
[45] Date of Patent: Feb. 22, 1994

[54] AUTOMOTIVE SEAT WITH SEAT CUSHION TILT DEVICE

[75] Inventors: Yoshihiro Mizushima; Akira Aoki, both of Akishima, Japan

[73] Assignee: Tachi-S Co. Ltd., Akishima, Japan

[21] Appl. No.: 953,928

[22] Filed: Sep. 29, 1992

[51] Int. Cl.⁵ .................................................. A47C 7/02
[52] U.S. Cl. ............................. 297/452.38; 248/345.1; 297/463
[58] Field of Search ............... 297/344, 452, 463; 248/345.1, 429, 430, 615

[56] References Cited

U.S. PATENT DOCUMENTS

| | | | |
|---|---|---|---|
| 4,534,595 | 8/1985 | Abe et al. | 297/452 |
| 4,949,931 | 8/1990 | Fujiwara et al. | 248/430 |
| 4,973,105 | 11/1990 | Itou . | |
| 5,007,682 | 4/1991 | Kuwabara et al. | 297/452 |
| 5,131,721 | 7/1992 | Okamoto | 297/452 |
| 5,150,872 | 9/1992 | Isomura | 248/429 |
| 5,156,437 | 10/1992 | Hayakawa et al. | 297/344 |
| 5,188,329 | 2/1993 | Takahara | 248/345.1 |
| 5,228,659 | 7/1993 | Potes, Jr. et al. | 248/429 |

FOREIGN PATENT DOCUMENTS 3-48598 5/1991 Japan .

Primary Examiner—Peter M. Cuomo
Assistant Examiner—Michael J. Milano
Attorney, Agent, or Firm—Oldham, Oldham & Wilson Co.

[57] ABSTRACT

An automotive seat with a seat cushion tilt device, wherein a seat cushion may be tilted forwardly or downwardly by the seat cushion tilt device in relation to a slide rail disposed under the seat cushion, and wherein a shield cover is secured on the slide rail to cover a spacing defined at the backward section of the seat cushion. The shield cover is provided with an auxiliary cover member which serves to cover a clearance which is to be created between the shield cover and the foregoing spacing when the seat cushion is tilted forwardly or backwardly by operation of the seat cushion tilt device, whereby a part of the slide rail and seat cushion tilt device are prevented against exposure through such spacing.

8 Claims, 4 Drawing Sheets

AUTOMOTIVE SEAT WITH SEAT CUSHION TILT DEVICE

BACKGROUND OF INVENTION

1. Field of the Invention

The present invention relates to an automotive seat with a seat cushion tilt device.

2. Description of Prior Art

Reference is made to FIGS. 1 to 4, in which is shown an example of conventional automotive seat (AS) with a seat cushion tilt device (50). The seat (AS) comprises a seat cushion (SC), a seat back (SB), the tilt device (50), a reclining device (RD), and a pair of shield covers (20).

As best shown in FIG. 2, the seat cushion tilt device (50) is normally comprised of a forward link mechanism (51, 52), a backward link mechanism (53, 54), a motor (M), and gear unit (G). Those forward and backward link mechanism (51, 52, 53, 54) as well as the gear unit (G) are interposed between a pair of spaced-apart upstanding brackets (13)(13). The two upstanding brackets (13)(13) are respectively provided on a pair of spaced-apart slide rails (10)(10). The motor (M) is mounted at one of the two upstanding brackets (13)(13) for operative connection with the gear unit (G). Each of the two slide rails (10)(10) comprises an upper rail (11) and a lower rail (12), such that the upper rail (11) is slidable forwardly and backwardly upon the lower rail (12).

Both forward and backward link mechanisms stated above are connected to the bottom surface of the seat cushion (SC), with the two upstanding brackets (13)(13) extending along the respective both lateral sides of seat cushion (SC). The seat back (SB) is rotatably connected to the backward end portion of seat cushion (SC) via the reclining device (RD) and backward upwardly projected area of the upstanding bracket (13).

With a particular reference to FIG. 1, the illustrated mode of seat cushion (SC), which is found in most of conventional seat, is so formed to define therein a wider forward section (SC1) and a narrow backward section (SC3). As shown, the forward section (SC1) includes a pair of lateral portions (SC2)(SC2) to assume a greater width than that of the backward section (SC3). Thus, there are defined a pair of lateral recessed zones on the respective lateral opposite sides of the backward section (SC3). A pair of shield covers (20)(20) are attached over those lateral recessed zones at the backward section (SC3) of seat cushion (SC) to prevent exposure of the interior parts, i.e. a part of the slide rail (10), several parts of the tilt device (50), and reclining device (RD). Each of the covers (20) is fixed upon the upper rail (11) of slide rail (10) by means of securing screws (60). Designations (22)(22) denotes recessed areas formed in the cover (20) in which the securing screws (60) are inserted and fixed to the upper rail (11).

However, even with the above-described structure of seat cushion (SC), as can be seen from FIGS. 3 and 4, there is created a clearance (w) between the forward section (SC1) of seat cushion (SC) and the forward surface of shield cover (20), when causing the seat cushion (SC) to be tilted forwardly by operation of the tilt device (50), as indicated by the two-dot chain line in FIG. 3. As result, such clearance (w) is created on both sides of the narrow backward section (SC3) of seat cushion (SC) as in FIG. 4, and through those clearances (w), the interior parts, such as a part of slide rail (10) and parts of tilt device (50), are exposed and come into view from the outside, regardless of the shield covers (20), which impairs the aesthetic appearance of the seat.

SUMMARY OF THE INVENTION

In view of the above-stated drawbacks, it is therefore a purpose of the present invention to provide an improved automotive seat with a seat cushion tilt device, which permits for covering a clearance which is created between a seat cushion and a shield cover when the seat cushion is tilted forwardly or donwardly by operation of the seat cushion tilt device.

In order to attain such purpose, according to the present invention, an automotive seat with a seat cushion tilt device basically comprises a seat back, a seat cushion having, defined at its backward section, a spacing through which a reclining device is mounted between the seat back and seat cushion in order to allow inclination of the seat back relative to the seat cushion by operation of the reclining device, a slide rail which is connected with the seat cushion via the seat cushion tilt device, wherein a backward portion of the slide rail is situated at the foregoing sapcing of seat cushion, and the seat cushion may be tilted forwardly or backwardly on the slide rail by operation of the seat cushion tilt device, a shield cover secured on the slde rail for covering said spacing, and an auxiliary cover means provided at the shield cover, the auxiliary cover means serving to cover a clearance which is to be created between the shield cover and spacing of seat cushion when the seat cushion is tilted forwardly or backwardly by operation of the seat cushion tilt device, thereby preventing exposure of a part of the slide rail and a part of the seat cushion tilt device through such clearance.

Preferably, the auxiliary cover means projects from the shield cover towards one wall of the seal cushion which surrounds the spacing.

Preferably, the auxiliary cover means may comprise an auxiliary cover having an upper horizontal wall and a vertical lateral wall extending therefrom, or may comprises an auxiliary cover of a channel shape having an upper horizontal wall, a lower horizontal wall and a vertical wall between said upper and lower horizontal walls.

In one aspect of the invention, there is formed a hollow zone within a portion of the seat cushion corresponding to one wall of the same seat cushion which surrounds the foregoing spacing, so that the hollow zone accommodates therein a free end portion of the auxiliary cover means. Preferably, such hollow zone is formed in an upwardly recessed manner within that portion of seat cushion.

DETAILED DESCRIPTION OF PREFERRED EMBODIMENT OF THE INVENTION

Since the present invention is directed to an improvement based wholly upon the previously stated prior-art automotive seat (AS) with the seat cushion tilt device (50), it is to be firstly understood that all like designations in the prior art description above correspond to all like designations to be given hereinafter and that a specific description is omitted for all the common elements and parts between the prior art and the present invention.

Referring now to FIGS. 5 through 8, there is illustrated an embodiment of the present invention. According thereto, firstly each of the two shield covers (20) is provided with an auxiliary cover member (30), and secondly a hollow zone (40) is formed in the backward part of one lateral seat cushion section (C2).

Figure 7:
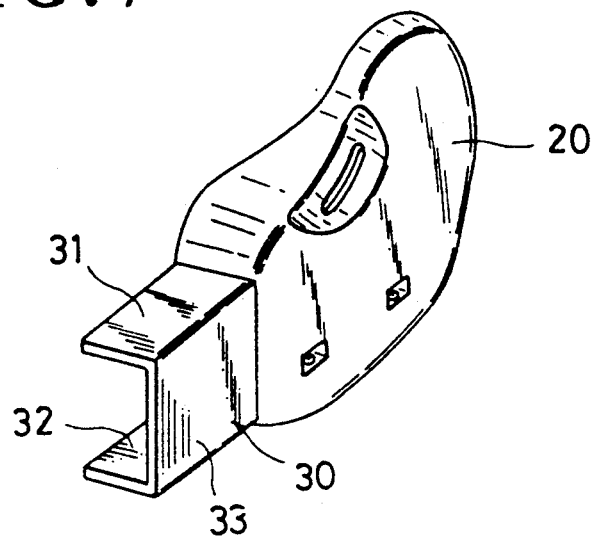
FIG. 7 is a perspective view of a shield cover provided with an auxiliary cover member.

FIG. 7 depicts the auxiliary cover member (30) as being provided with a forward surface of the cover (20). The auxiliary cover member (30) is formed in a channel shape in section, comprising an upper horizontal section (31), a lower horizontal section (32) and a vertical section (33) defined between those upper and lower horizontal sections (31)(32). As shown, the auxiliary cover member (30) projects forwardly of the cover (20).

Figure 5:
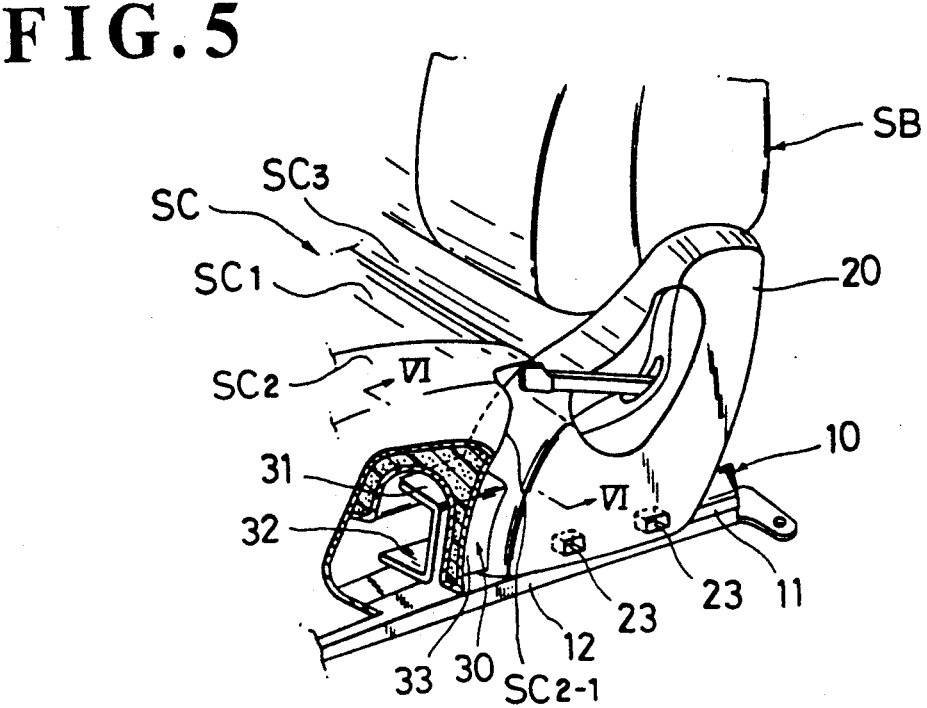
FIG. 5 is partly broken perspective view of a principal part of automotive seat with a seat cushion tilt device in accordance with the present invention.
Figure 6:
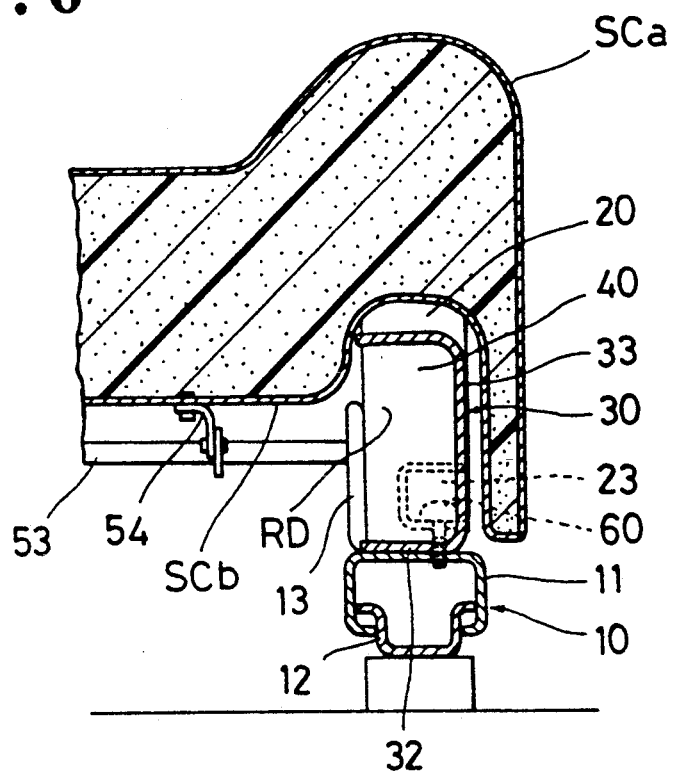
FIG. 6 is partial sectional view taken along the line IV—IV in FIG. 5.

As can be seen from FIGS. 5 and 6, the auxiliary cover member (30) extends upon and along the slide rail (10) towards the backward vertical wall (SC2-1) of one lateral section (SC2) associated with the seat cushion (SC) and enters a the hollow zone (40). In particular, the upper horizontal section (31) of auxiliary cover member (30) should preferably extend as much close as possible to the vertical lateral wall of the seat cushion narrow section (SC3).

FIGS. 5 and 6 show the hollow zone (40) to be formed in one lateral section (SC2) of seat cushion (SC). The hollow zone (40) is intended to accommodate therein the foregoing auxiliary cover member (30), and thus so dimensioned that its height is defined from the upper surface of upper rail (11) of slide rail (10) at a level sufficiently greater than the height of the upper horizontal section (31) of auxiliary cover member (30), and that its width is relatively greater than that of both upper and lower horizontal sections (31)(32) of the same auxiliary cover member (30).

According to the illustrated embodiment in FIGS. 5 and 6, the hollow zone (4) is formed in an upwardly recessed fashion in the bottom surface of a foam cushion member (SCd). This formation is advantageous in avoiding a contact between the seat cushion (SC) and the auxiliary cover member (30), when causing the seat cushion (SC) to be tilted forwardly or backwardly by operation of the tilt device (50).

Designations (SCa) and (SCb) denote an upper cover member affixed over the outer surfaces of seat cushion (strictly stated a foam cushion member thereof), and a bottom cover member affixed over the bottom surface of seat cushion, respectively. As shown, the bottom cover member is also affixed over the walls of the foregoing hollow zone (40) within the lateral section (SC2) of seat cushion.

The auxiliary cover member (30) may be formed integrally with the shield cover (20).

Figure 1:
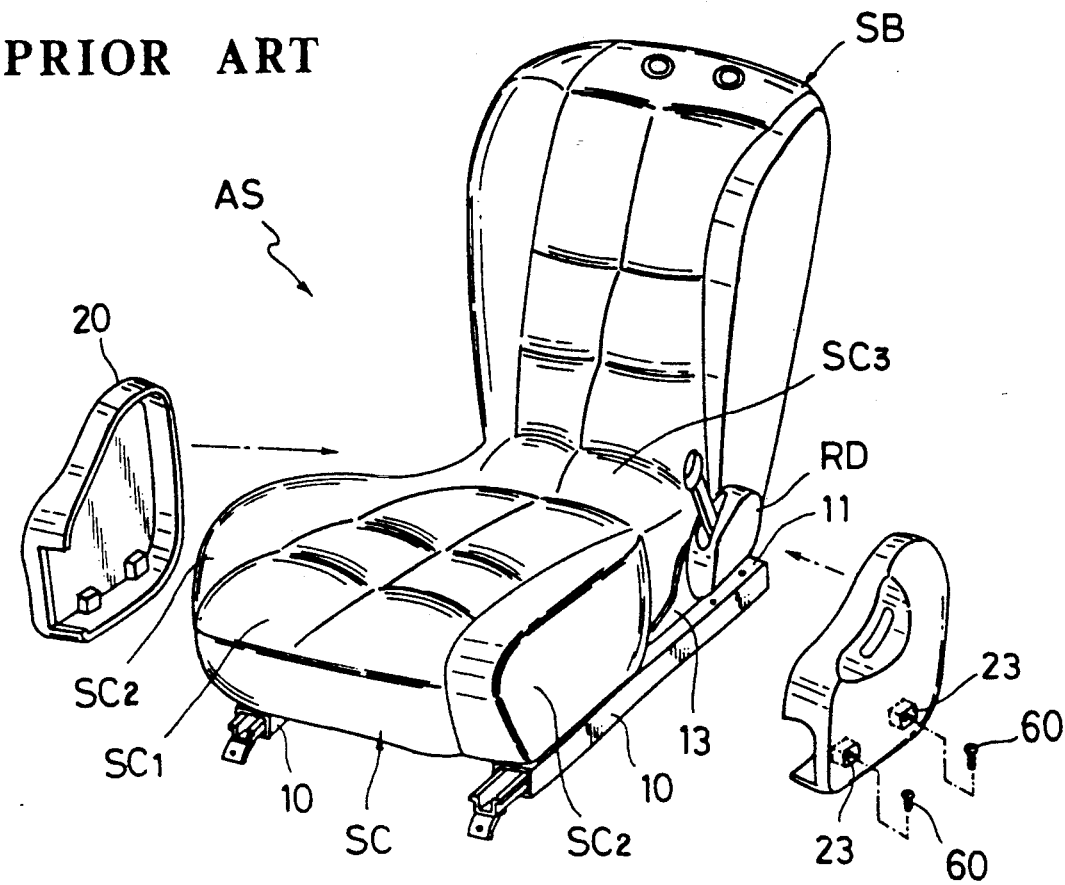
FIG. 1 is a partly exploded perspective view of a conventional automotive seat with a seat cushion tilt device.
Figure 2:
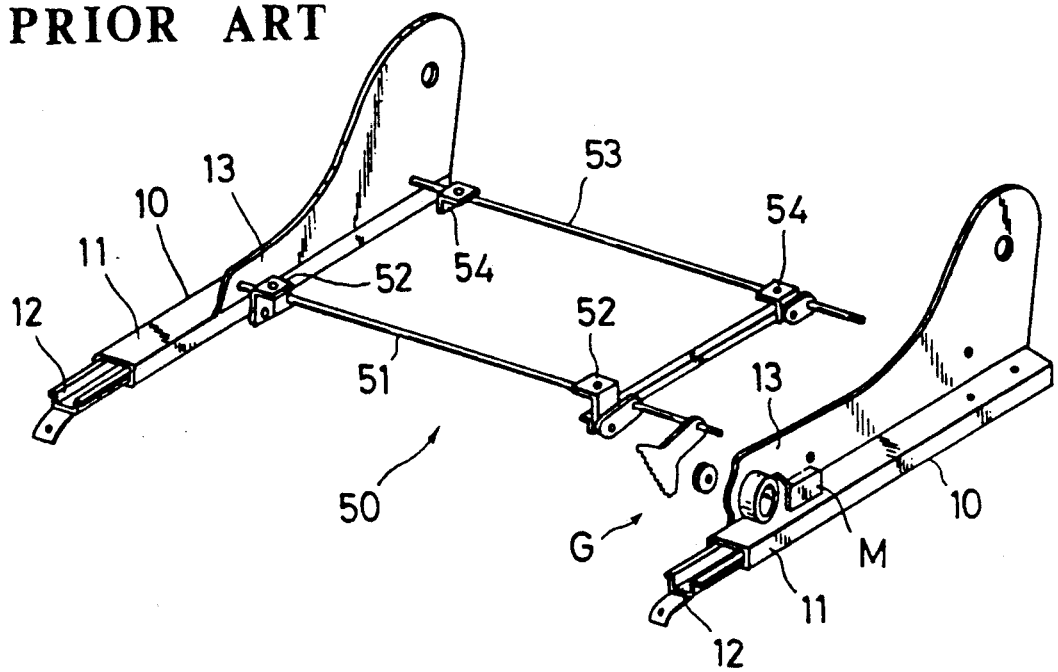
FIG. 2 is an exploded perspective view of the seat cushion tilt device.
Figure 3:
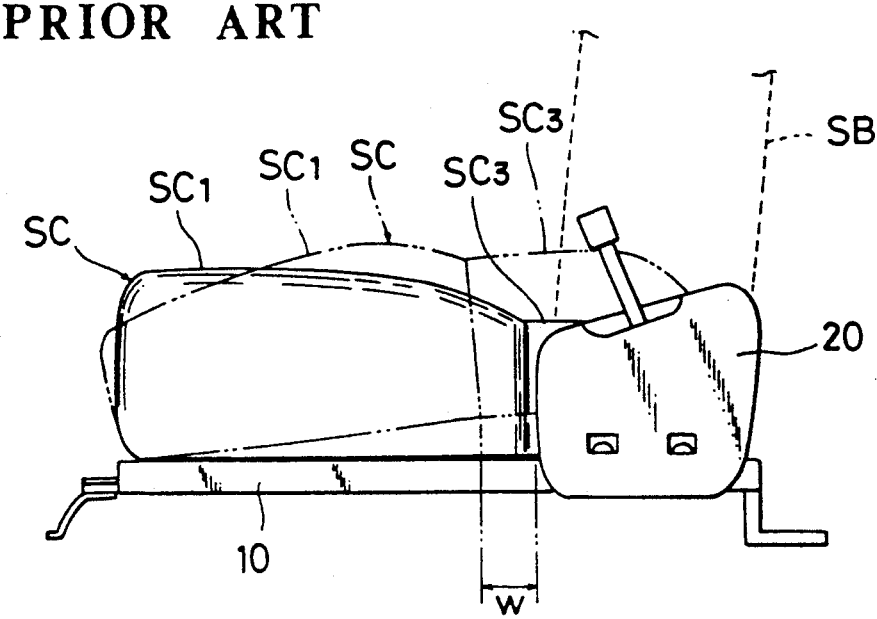
FIG. 3 is a partly broken schematic side view of the conventional seat as in FIG. 1.
Figure 4:
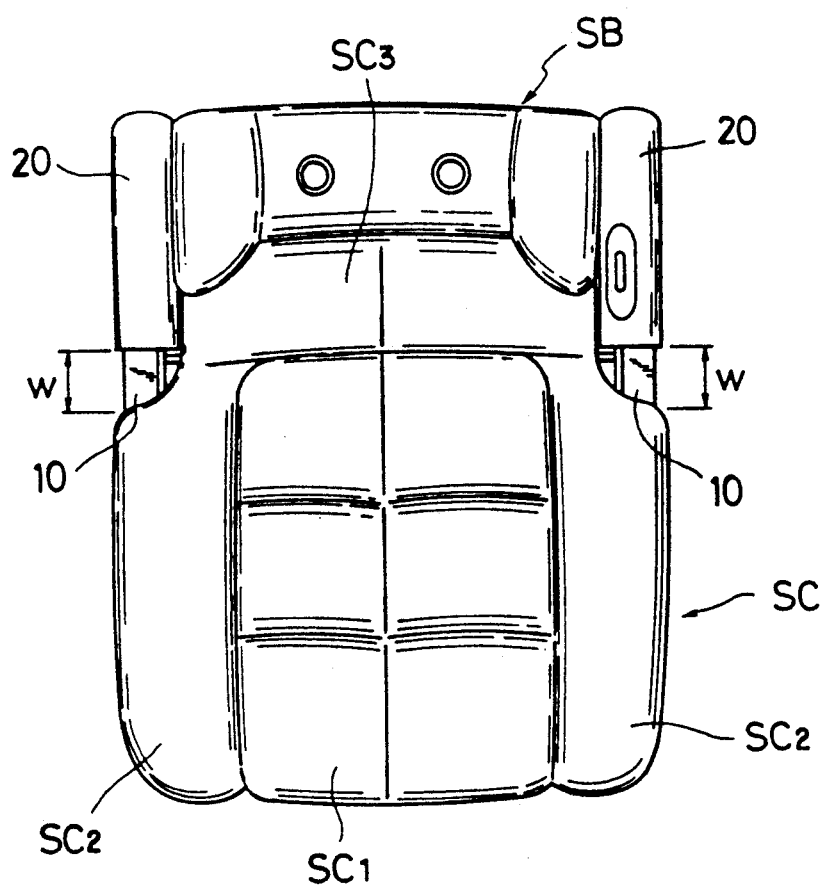
FIG. 4 is a plan view of the same conventional seat.
Figure 8:
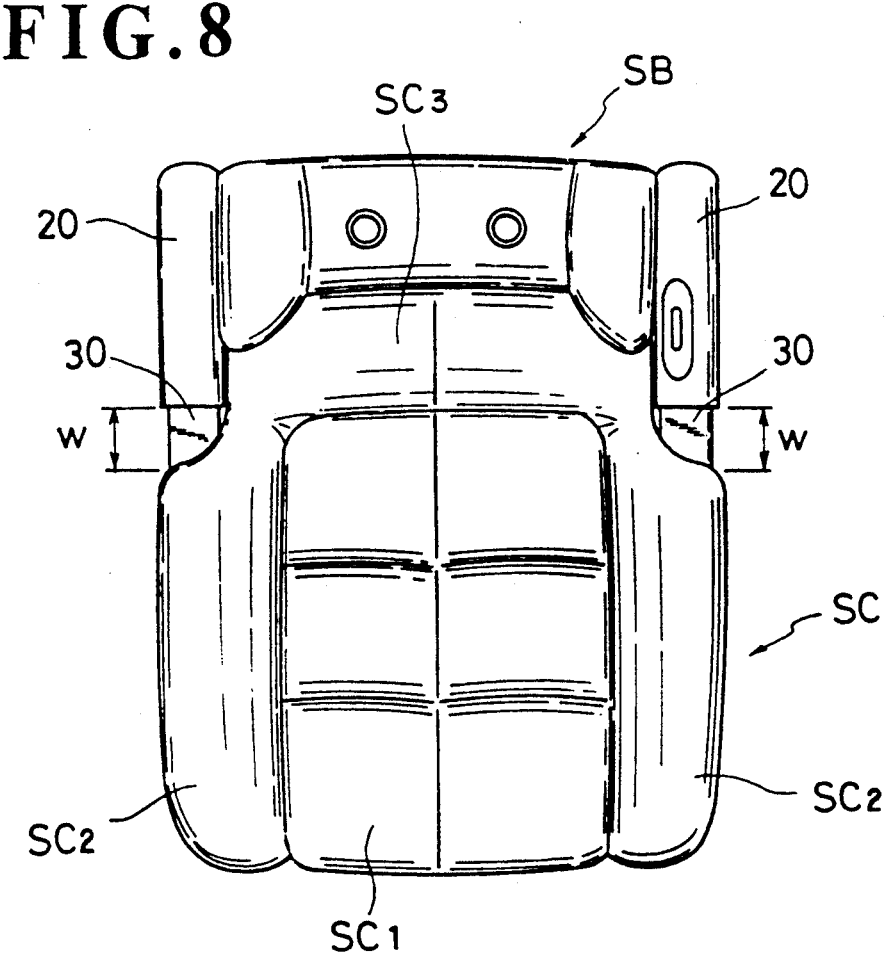
FIG. 8 is a plan view of the automotive seat of the present invention.

From the descriptions above, it is appreciated that, irrespective of the seat cushion (SC) being tilted downwardly as indicated by the two-dot chain line in FIG. 3, creating the clearance (w) between the backward part (at (SC2-1) in FIG. 5) of seat cushion lateral section (SC2) and the forward surface of shield cover (20), both two auxiliary cover members (30)(30), as shown in FIG. 8, cover the respective spacings at such clearance (w) to prevent the aforementioned interior parts from being exposed therefrom, thus keeping good the appearance of the seat (AS).

While having described the present invention as above, the invention is not limited to the illustrated embodiments, but any other modifications, replacements and additions may be applied structurally thereto without departing from the scopes of the appended claims.

What is claimed is:

1. An automotive seat with a seat cushion tilt device, comprising:
   a seat back;
   a seat cushion having, defined at its backward section, a spacing through which a reclining device is mounted between said seat back and seat cushion in order to allow inclination of said seat back relative to said seat cushion by operation of said reclining device;
   a slide rail which is connected with said seat cushion via said seat cushion tilt device, wherein a backward portion of said slide rail is situated at said spacing of said seat cushion, exposing partly therethrough together with a part of said seat cushion tilt device, and said seat cushion may be tilted forwardly or backwardly upon said slide rail by operation of said seat cushion tilt device;
   a shield cover which is secured on said slide rail so as to cover said spacing; and
   an auxiliary cover means provided at said shield cover, said auxiliary cover means serving to cover a clearance which is to be created between said shield cover and said spacing of said seat cushion when said seat cushion is tilted forwardly or backwardly by operation of said seat cushion tilt device, thereby preventing exposure of said part of said slide rail as well as said part of said seat cushion tilt device through said clearance.

2. The automotive seat as claimed in claim 1, wherein said auxiliary cover means projects towards one wall of said seat cushion which surrounds said spacing.

3. The automotive seat as claimed in claim 1, wherein said auxiliary cover means projects towards one wall of said seat cushion which surrounds said spacing, and there is formed a hollow zone within a portion of said seat cushion corresponding to said one wall, said hollow zone being for accommodating therein a projected free end part of said auxiliary cover means.

4. The automotive seat as claimed in claim 1, wherein said spacing is a pair of recessed portions, each being defined at respective backward sides of said seat cushion.

5. The automotive seat as claimed in claim 3, wherein said hollow zone is formed in an upwardly recessed manner within said portion of said seat cushion.

6. The automotive seat as claimed in claim 1, wherein said auxiliary cover means is integrally formed with said shield cover.

7. The automotive seat as claimed in claim 1, wherein said auxiliary cover means comprises an auxiliary cover having at least an upper horizontal wall and a vertical wall extending downwardly therefrom, and said clearance is covered by the thus-formed auxiliary cover.

8. The automotive seat as claimed in claim 1, wherein said auxiliary cover means comprises an auxiliary cover of a channel shape having an upper horizontal wall, a lower horizontal wall and a vertical wall between said upper and lower horizontal walls, and said clearance is covered by the thus-formed auxiliary cover.

* * * * *